United States Patent [19]

Eggen

[11] Patent Number: 4,784,195
[45] Date of Patent: Nov. 15, 1988

[54] APPARATUS AND METHOD FOR HARVESTING WOODY PLANTATIONS

[76] Inventor: David L. Eggen, Rte. 1, Box 257, Moose Lake, Minn. 55767

[21] Appl. No.: 79,132

[22] Filed: Jul. 29, 1987

[51] Int. Cl.⁴ .............................................. A01G 23/08
[52] U.S. Cl. ..................................... 144/337; 56/377; 144/34 R; 144/34 B; 241/101.7
[58] Field of Search ................. 241/101.7, 93; 56/365, 56/370, 376, 377; 144/3 D, 2 Z, 34 R, 336, 337, 335, 34 B

[56] References Cited

U.S. PATENT DOCUMENTS

| | | | |
|---|---|---|---|
| 3,125,845 | 3/1964 | Lee | 56/377 |
| 3,320,735 | 5/1967 | Sutherland et al. | 56/377 |
| 3,856,060 | 12/1974 | Savage et al. | 144/34 B |
| 3,979,075 | 9/1976 | Heron | 144/34 R |
| 4,214,428 | 7/1980 | Caraway | 56/377 |
| 4,236,554 | 12/1980 | Nicholsoni | 144/34 R |
| 4,338,985 | 7/1982 | Smith et al. | 144/34 R |
| 4,537,362 | 8/1985 | Zuloaga | 241/101.7 |

OTHER PUBLICATIONS

Catalog Brochure, undated, of Symonds Australia, Inc. entitled "Specialized Site Preparation Equipment".

Primary Examiner—W. Donald Bray
Attorney, Agent, or Firm—Kinney & Lange

[57] ABSTRACT

A tree harvester for harvesting felled trees includes a wheel mounted wood chipper which moves toward the butt ends of the tree stems to be processed. The harvester includes a plurality of rotating alignment discs in front of the chipper. These discs align the tree stems to be processed with the mouth of the chipper. A chipper infeed cylinder is rotatably mounted between the discs and the front end of the chipper, and lifts the tree stem butts up from the ground into alignment with the chipper inlet port. The chips discharge from the chipper and go into a chip hopper which moves with the tree harvester.

23 Claims, 5 Drawing Sheets

APPARATUS AND METHOD FOR HARVESTING WOODY PLANTATIONS

This invention was made with Government support under contract No. DE-AC02-86ER80384 awarded by the Department of Energy. The Government has certain rights in this invention.

BACKGROUND OF THE INVENTION

1. Field of the Invention.

This invention has relation to a tree harvester useful to harvest felled trees by recovering them from the ground and reducing them to chips. The invention has relation to a method for felling, windrowing, drying and harvesting woody biomass; and to a method of harvesting woody plantations to foster regrowth of multiple stems from single stumps.

2. Description of the Prior Art.

It is known to feed felled tree stems into chipping machines or chippers which convert the tree stems or trunks into chips which can be used as fuel or fiber. Typically, felled trees, and limbs of trees, are physically fed into a chipping machine one tree trunk or stem at a time using an overhead crane and/or a horizontal conveyor to feed the tree into the chipper at a rate that the chipper can handle without it becoming jammed. Usually the felled tree stem is trimmed of branches or "slash" and then transported to the chipper.

Short rotation woody plantations are being grown to rapidly produce wood fiber for many purposes. Such crops are felled and harvested before the tree stems are any larger than about 30 cm at the butt. Felling and trimming is accomplished using hydraulic shears and/or chain saws and this results in leaving stumps anywhere from about 5 cm to 50 cm above the ground. To harvest such woody plantations having tree stems measuring in the neighborhood of 30 cm at the butt is labor intensive, time consuming, difficult and therefore expensive where the chipper can only operate on one stem at a time and/or when the tree stems must be transported to the chipper.

Also, the presence of such stumps extending above the ground prevents uniform and effective replanting and/or subsequent harvesting. The damage done to such stumps when they must be removed by bulldozing or use of other heavy equipment renders the wood fibers therein unusable except for fuel and tends to destroy the root systems preventing sprouting.

Relatively small trees having butts of approximately 30 cm can be felled by using upright tree grapples and shears, but such shears tend to crush the wood fibers and make a significant part of such fibers unuseable for any purpose except fuel or wood pulp.

A rotary rake has been developed to pile up rows of discarded tree parts for burning on forest clear-out sites. This rake is manufactured for and sold by Symonds Australia, Inc. of P.O. Box 10297, Savannah, Ga. 31412. It is illustrated in their undated catalog brochure entitled "SPECIALIZED SITE PREPARATION EQUIPMENT."

What was needed before the present invention was a method and apparatus for felling trees using a slicing shearing action at ground level without appreciable damage to the remaining stumps and root systems or to the wood fibers at the butts of the sheared and felled tree stems. Such apparatus should include a tree harvester which is able to harvest such felled trees as they lie by picking the tree stem butts up off the ground, conveying the tree stems into a chipper as the harvester moves toward the trees, and then discharging the tree chips from the chipper into a vehicle moving with the tree harvester. When a woody plantation has been so harvested, the area should be free from stumps above ground level to facilitate movement of equipment without damage to remaining root systems. Stumps should terminate at ground level to foster regrowth of multiple stems from single stumps.

SUMMARY OF THE INVENTION

A tree harvester for harvesting felled trees includes a wheel-mounted, longitudinally extending main frame, a prime mover operable to move the main frame along its longitudinal axis in a forward direction, a felled tree processor supported on the main frame, having a forwardly facing infeed port for receiving trees to be processed and having a discharge port for discharging processed trees, tree stem infeed means mounted with respect to the main frame in position to lift the tree stem butts of felled trees as the main frame moves forward and to carry the tree stems into the felled tree processor infeed port, and funneling means to move the trees being harvested into longitudinal alignmnt with the tree processor infeed port.

In the form of the invention as shown, the felled tree processor is a chipper which processes the felled trees by reducing them to tree chips, the tree stem infeed means is constituted as a chipper infeed cylinder rotatably mounted with respect to the main frame on a generally horizontal axis in position to lift the tree stem butts and to carry them into a chipper infeed port, there being means to rotate this chipper infeed cylinder in direction to carry the trees into the chipper.

The means for funneling the tree stems into alignment with the chipper infeed port includes a pair of alignment disc support arms mounted with respect to the main frame, one on each side of the tree processor infeed port, these arms extending forwardly from the processor and diverging outwardly from each other. At least two upright partially overlapping, ground contacting, felled tree alignment discs are rotatably mounted with respect to each of the disc support arms to be in acing relation to the discs on the other arm, and a rearward portion of each forward disc is positioned in overlapping relation to a forward portion of its adjacent rearward disc and on a side of the rearward disc toward the longitudinal axis of movement of the main frame. Means is provided to cause these discs to rotate to move an upper portion of the disc in a forward direction when the main frame moves in a forward direction to cause the stems of the felled trees being harvested to tend to move toward the longitudinal axis of movement of the main frame as the felled trees come in contact with these discs. The discs and support arms are so positioned that the stems of the trees being harvested are directed to the tree stem infeed means in longitudinal alignment with the tree processor infeed port and into the processor infeed port.

The invention includes a method of harvesting felled trees to reduce them to chips of wood fibers including arranging the felled trees in windrows with their tree stems all pointing in the same direction; feeding the butt ends of the windrowed trees into a tree stem infeed port of a movable tree chipper as the chipper moves along the windrow, and discharging the resulting wood chips from a chip discharge port of the chipper into a chip hopper which moves with the chipper.

The invention includes a method of managing existing short rotation woody plantations in areas where temperatures occur which are low enough to freeze growing wood fibers above and below the ground. That method includes the steps of slicing and/or shearing the tree stems from their root systems at ground level when the wood fibers in the tree stems and the wood fibers at least immediately below ground are frozen; felling the severed trees to tend to cause adjacent trees to fall to have their tree stems pointing in the same direction; and then harvesting aligned adjacent trees by feeding their butt ends into a tree stem infeed port of a movable tree chipper as the chipper moves in direction longitudinally of the aligned tree stems.

DETAILED DESCRIPTION OF THE PREFERRED EMBODIMENTS

A tree harvester 10 as seen in FIGS. 1 through 5 includes a longitudinally extending main frame 12 which is supported for forward movement of the harvester along a longitudinal main frame axis 13 by appropriate powered, idler and steering wheels indicated generally at 14. These "wheels" could be half-tracks, skids or any combination thereof.

Mounted on the main frame 12 is an operator's cab 16, a prime mover 18, a chipper 20, and a knuckle boom loader grapple 21. The main frame includes parallel, spaced apart main frame beams 15, 15.

A tree alignment disc support frame 22 extends forwardly from a forward end fo the main frame 12 and includes a pair of alignment disc support arms 24, 24 extending forwardly and diverging outwardly from each other. As shown, the forward ends of these disc support arms 24 are supported by wheels 25, 25. These arms 24 can also be supported or lifted clear for transport by linear disc support arm control motors 23, 23. These motors 23 can take the form of hydraulic piston/- cylinder motors and, for clarity of illustration, only one is shown.

In the form of the invention as shown, two felled tree alignment discs 26 are rotatably and pivotally supported with respect to each of the support arms 24. These discs 26 include two forward alignment discs 27 and two rearward alignment discs 28, one of each being supported on each of the arms 24, 24. Each of these discs 26 includes an alignment disc shaft 29 and is journaled as at 30 in a rearward end portion of its own independent hinged jump link 32. Each such jump link is hinged or pivoted to one of the disc support arms 24 as at 34.

Figure 2:
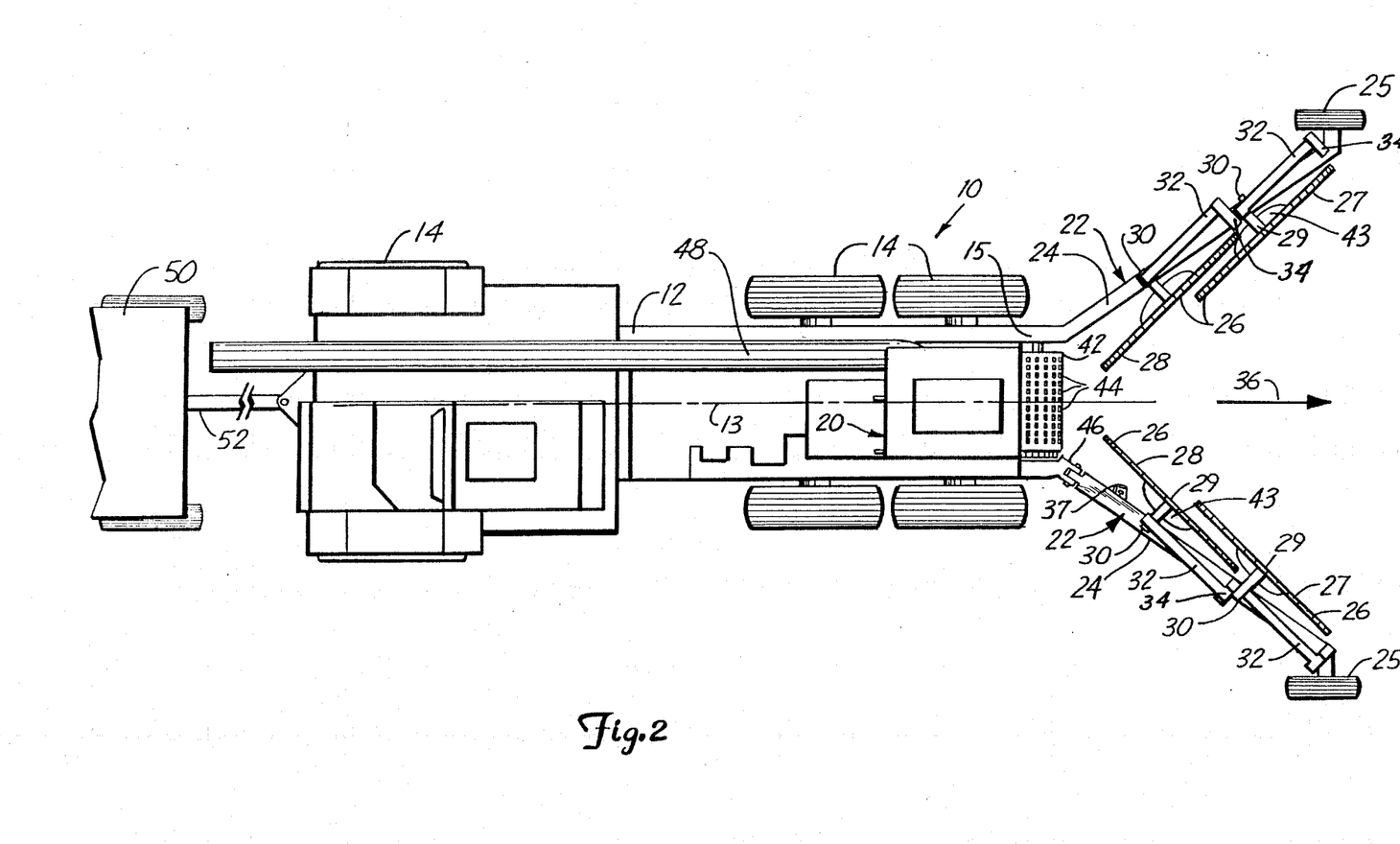
FIG. 2 is a top plan view of the harvester of FIG. 1 with disc support arm control motors omitted for clarity of illustration.
Figure 3:
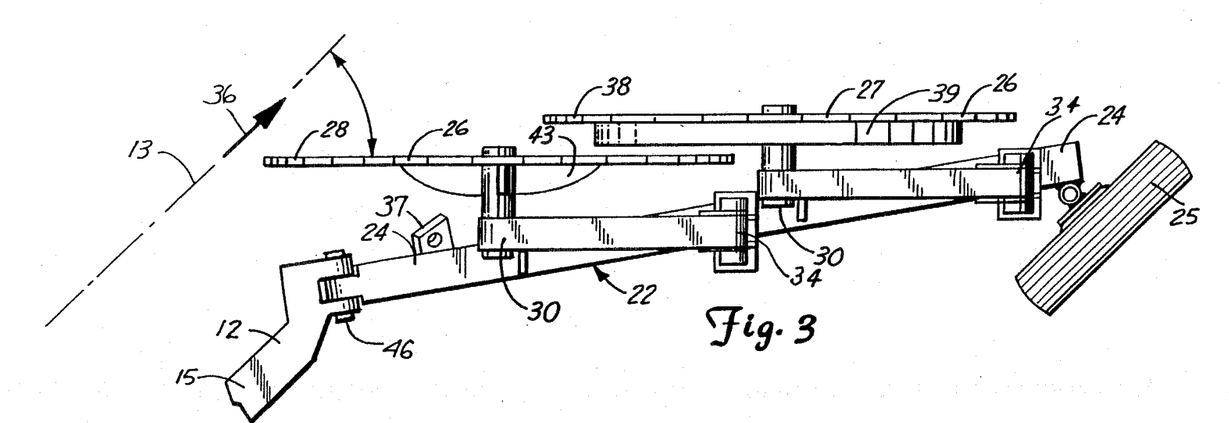
FIG. 3 is a fragmentary top plan view of one of a pair of disc support amrs and associated tree alignment discs of the harvester as seen in FIG. 2 but also showing certain modifications to the harvester to FIGS. 1 and 2.

In an early prototype of the invention, the support arms 24, 24 extended integrally forwardly from forward ends of main frame beams 15 and 15. Variations in the level of the ground being traversed were accommodated by the pivoting of each disc 26 on its own hinged jump link 32. Such an integral structural relationship is illustrated in FIG. 2 with respect to the uppermost alignment disc support arm 24 and main frame beam 15 as seen in that figure.

In a presently preferred form of the invention, support arms 24, 24 are each pivotally mounted to a forward end portion of one of the main frame beams 15 as at 46. This construction is illustrated in FIG. 2 as to the lowermost arm 24 and beam 15 as seen in that figure. It is also illustrated in FIGS. 1, 3, 4 and 6.

Each of the disc support arm control motors or hydraulic piston/cylinder motors 23 are pivotally mounted at one end with respect to the main frame 12 and operator's cab 16 as at 35 and are pivotally mounted with respect to a disc support arm 24 as at 37.

The prime mover 18 is adapted to move the tree harvester 10 in forward direction along the longitudinal main frame axis 13 in the direction of an arrow 36. Means are provided to cause the alignment discs to rotate on their journals 30 in direction so that the lower portions of the discs are moving rearwardly with respect to the forward motion of the main frame and the disc support frame while upper portions are moving forwardly. Because of the angle of the discs, all tree stems and other materials encountered by the discs will be moved toward axis 13 of movement of harvester 10.

One satisfactory means for accomplishing this rotation of the discs is to provide each alignment disc 26 with a plurality of teeth 38 extending outwardly therefrom and mounting the discs so that the teeth encounter the ground as the harvester moves forward.

Figure 6:
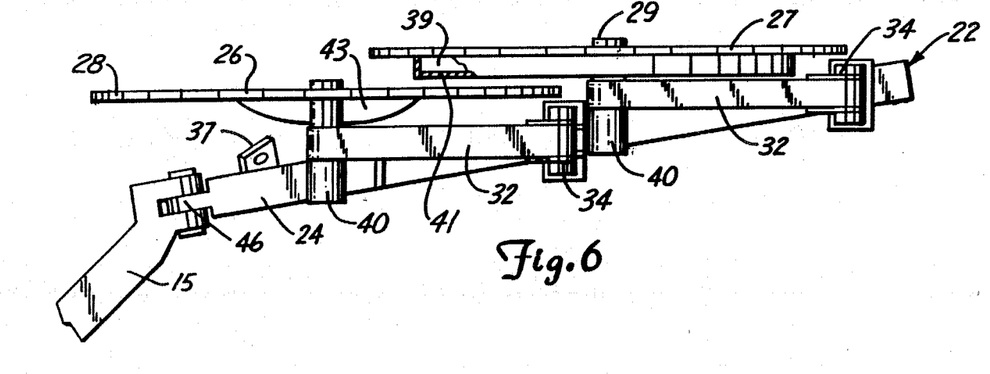
FIG. 6 is a top plan view similar to the fragmentary top plan view of the tree harvester of FIG. 3, but showing further modifications to the invention.

Another method of rotating the discs can be by hydraulic motor, and such motors 40 are shown in FIG. 6 by way of example, mounted on the rearward end portions of the jump links 32 in position to directly drive associated alignment discs 26. Such a drive can be effective whether or not teeth 38 are provided on the disc.

A studded chipper in-feed cylinder 42 is rotatably mounted to forward portions of the main frame 12 between the rearward end portions of the disc support arm 24, 24 and is rotated in direction to carry trees to be harvested up and into the chipper 20. In the form of the invention as shown, studs 44 extend outwardly from the face of the cylinder tend to engage and lift stems or other parts of the trees to be harvested up over the top of the cylinder and to feed them into the chipper as the cylinder 42 rotates.

Rotational movement of cylinder 42 can be provided in a usual or preferred manner. The speed of its rotation can be controlled to help prevent jams due to overloading the chipper; but in ordinary operation the peripheral movement of its cylindrical surface can be the same as or, preferably, slightly greater than the forward movement of the harvester over the ground.

The angle between each felled tree alignment disc 26 and the longitudinal axis 13 of forward movement of the harvester can be selected to accommodate the nature of the soil traversed, the size and character of the felled tree stems, and many other conditions. An angle of 35° has been found to be effective. However, larger angles, requiring that more power to be expended by the prime mover, and smaller angles, handling less felled trees on each pass, will also yield good results.

Figure 4:
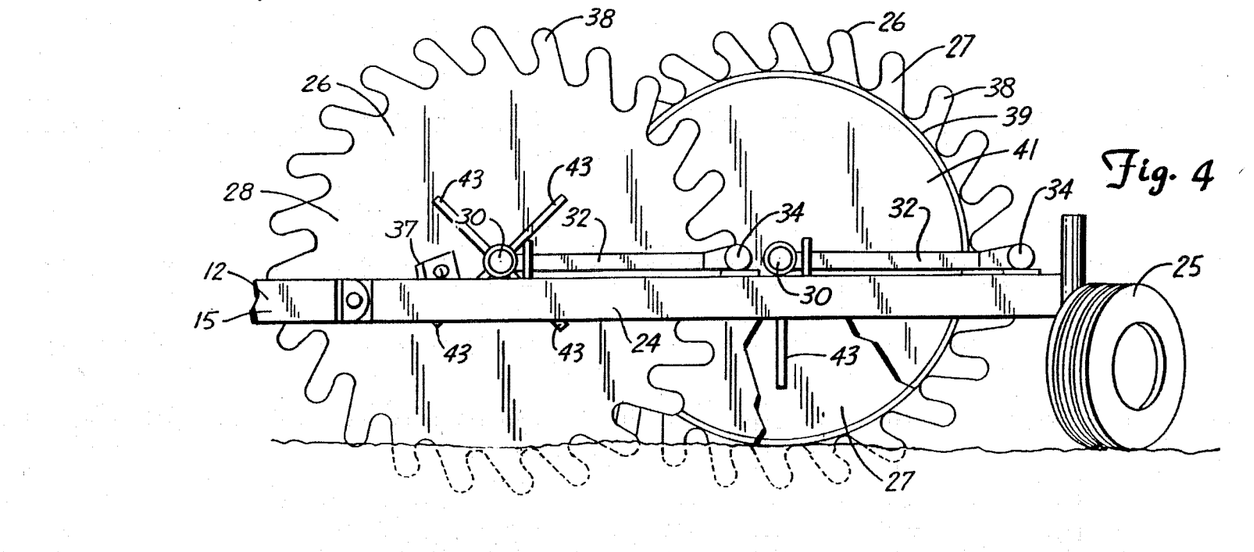
FIG. 4 is a side elevational view of the disc support arm and alignment discs of FIG. 3.
Figure 5:
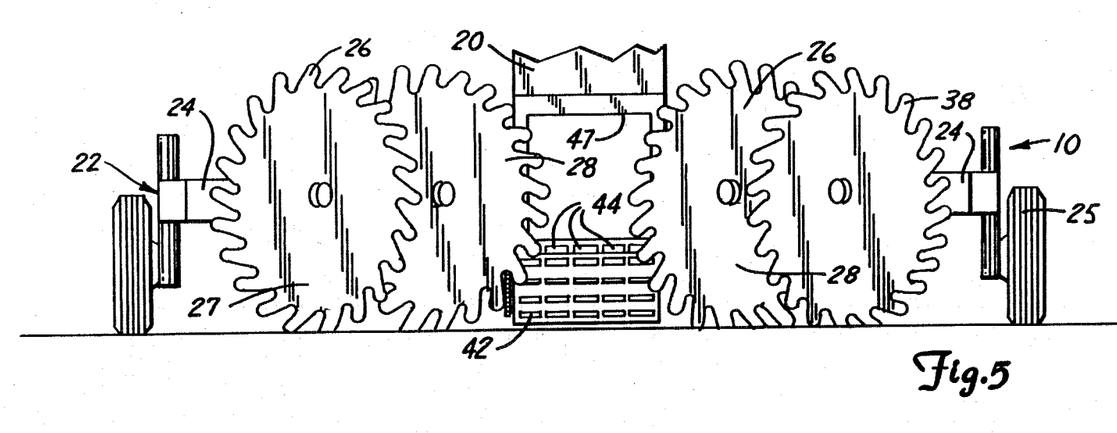
FIG. 5 is a fragmentary front elevational view of the apparatus of the invention as seen from the right in FIGS. 1 and 2.

As more experience is gained with a tree harvester made according to the present invention, an optimum angle between the disc 26 and the longitudinal axis of the main frame may be arrived at which is different from 35°. With disc support arms 24 pivoting vertically about connection point 46 with respect to a forward end of the main frame 12, when uneven ground is encountered as the tree harvester 10 moves forward, the disc support arm wheels 25, 25 will move independently to conform to the terrain, tending to keep the felled tree alignment discs 26 always sufficiently in contact with the ground so that no felled trees to be harvested will pass beneath them, and all will be moved into line toward the longitudinal main frame axis 13 where they can be picked up by in feed cylinder 42 and fed easily into the chipper.

Where the discs 26 are to be rotated by the action of disc teeth 38 digging into the ground, the disc control arm motors 23 can be used to force and hold the discs down so that the teeth stay buried in the gound. This is done by locking each of the hinged jump links 32 against movement with respect to its disc support arm 24 and by using the linear motors 23 to apply controlled downward pressure on the alignment disc support arms. To prevent unnecessary and unwanted digging of the discs to levels lower than needed to hold the disc teeth at an optimum depth, a cylindrical flange 39 can be provided extending outwardly from one or more of tree alignment discs mounted with respect to each of the disc support arms 24. Such a flange 39 is shown on the forward disc 27 in FIGS. 3, 4 and 6 mounted just below the roots of teeth 38. As best seen in FIGS. 4 and 6, a flat disc stiffening and flange support plate 41 is welded to the outermost edge of the flange 39 and serves, not only to reinforce the flange 39, but also be stiffen the disc 27 along with disc stiffening ribs 43.

Controls for the linear motors (not specifically shown) can be of any usual or preferred construction. Such controls are readily available in the marketplace. They can allow the motors 23:

(1) to hold the arms 24 down to supply a uniform predetermined downward force exerted by the discs 26 on the ground;
(2) to allow the arms 24 to "float" so that the weight of the arms and the discs determines the downward pressure; or
(3) to lift the entire tree alignment disc support frame and its discs clear of the ground for transport purposes.

When a disc 27 is forced into the ground by a motor 23 or by the weight of the parts, the limit of its penetration will be determined by the placement of flange 39. The flange will ride on the ground surface after the teeth have dug in. This positioning of the parts is clearly seen in FIG. 4. In this positioning, the entire weight of the arm 24 and everything supported on it will be supported on flange 39. This can make wheels 25, 25 unnecessary; and this is illustrated in FIG. 6 where the wheel has been omitted.

Figure 1:
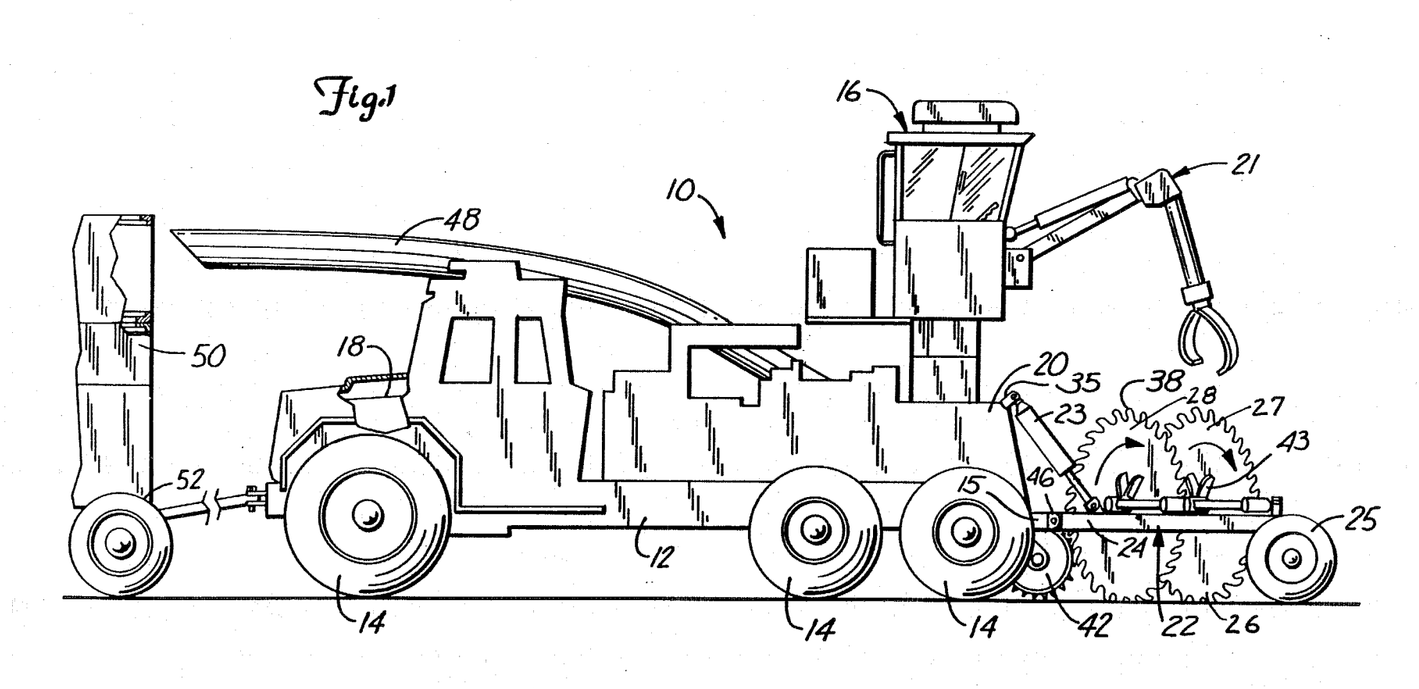
FIG. 1 is a side elevational view of a tree harvester and associated apparatus made according to the present invention.

The chipper itself includes a rectangular infeed port 47. As best seen in FIGS. 1 and 2, it also includes a discharge chute 48 which forms part of a chipper discharge port and delivers the chips from the chipper into a chip hopper 50 mounted on a trailer 52 towed behind the harvester 10. The form of chipper 20, and its internal mode of operation can be of any usual or preferred construction forming no part of the present invention per se. There are several suitable chippers presently available on the market.

A harvester for woody plantations such as the tree harvester 10 will be effective when the trees of a woody plantation have stems which vary in butt diameter from 1 cm to something over 30 cm. However, it is contemplated that structures can be made according to the invention to harvest an even wider range of sizes and shapes of trees and other woody growths. For effective harvesting, the trees will be severed from their roots at ground level and are windrowed with their butts all at the same end and with their stems lying generally parallel to the longitudinal axis 13 of the harvester as it moves in direction toward the tree butts.

Figure 7:
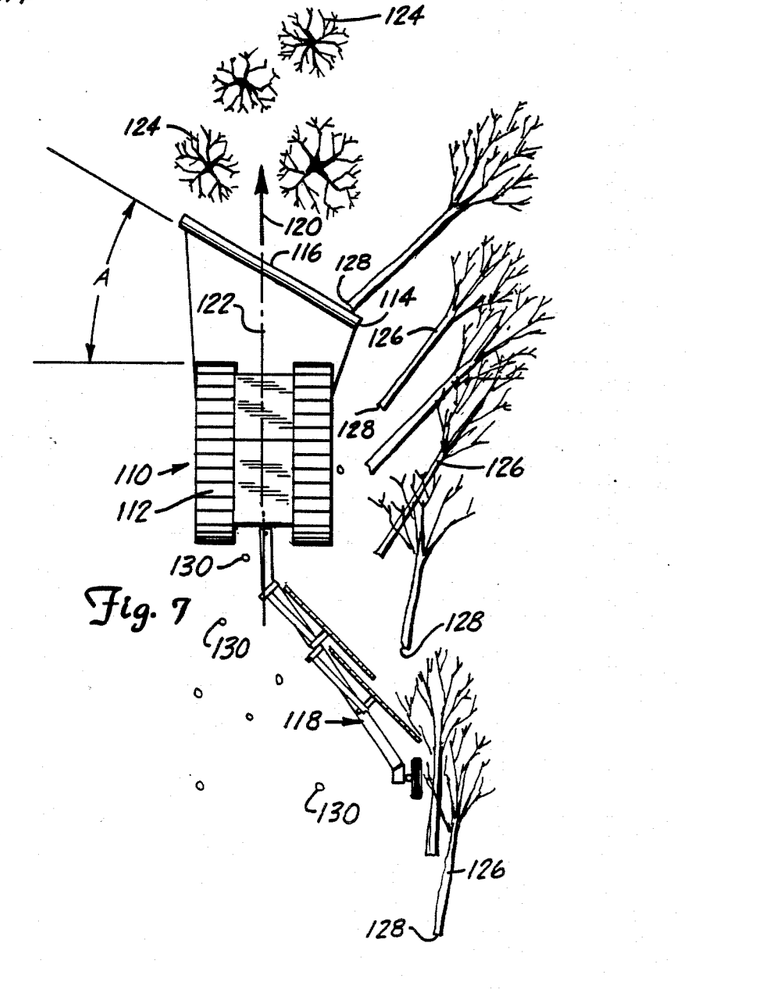
FIG. 7 is a top plan view of tree feller for severing standing tree stems flush with the ground and aligning them on the ground as a first step in preparing the trees to be harvested and reduced to chips by the tree harvester of FIGS. 1-5.
Figure 8:
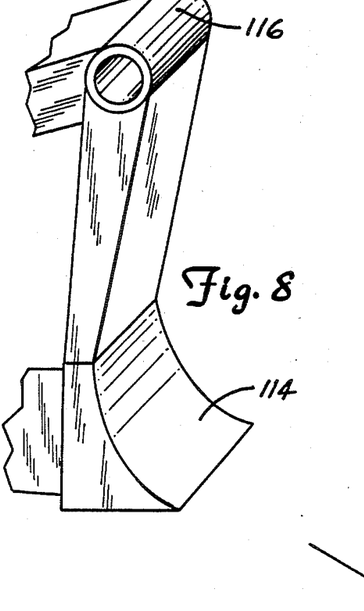
FIG. 8 is a perspective view of an angled shear blade and directional tree felling bar of the tree feller of FIG. 7.

As a first step in accomplishing this optimum alignment of the trees of a woody plantation to be harvested, a tree feller 110 can be utilized. As seen in FIGS. 7 and 8, such a tree feller can include a bulldozer or other primer mover 112, an angled shear blade 114, an angled, directional tree felling bar 116 and a rotary rake 118. In operation, the tree feller 110 will move in forward direction as indicated by arrow 120 along the longitudinal axis 122 of the bulldozer 112. The proper angle for the blade 114 and the proper angle for the bar 116 can vary; but initially the angle A in FIG. 7 has been set at 30°.

To be most effective, the tree feller can move in the same direction that the tree harvester will subsequently move so that the axis of movement 13 of the tree harvester 10 will subsequently be in substantially parallel relationship with respect to the axis of movement 122 of the tree feller 110.

The angled shear blade 114 of the tree feller 110 will be appropriately mounted to the front end of the bulldozer 112 so that the shear blade can slice and shear tree growth off flush with the level of the ground. The angled directional tree felling bar 116 will be located at an appropriate height above the bottom of the shear blade 114 and above the ground and in an appropriate position so that a tree being felled will be under stress from the tree felling bar to tend to cause it to fall away from the direction of movement of the tree feller and out of the path of the tree feller while the shear blade is shearing the tree from the ground.

A shear blade 114 having a shearing and slicing edge three meters long and positioned to cut a swath extending at least slightly wider than the path of the bulldozer along a longitudinal axis of its movement 122 has been found to be satisfactory. The height of the tree felling bar 116 can be adjustable. For some situations, a height of three meters has been found to be satisfactory.

In order to further align the tree stems, the rotary rake 118 can be towed behind the bulldozer. This rake can be similar to the rotary rake formed by one of the disc support arms 24 and its tree alignment discs 27 and 28, or can be of any other usual or preferred construction. A rotary rake such as manufactured and sold by Symonds Australia, Inc. of Savannah, Ga., will be satisfactory. While a two disc rake is disclosed in FIG. 7, a one disc rake or a rake with more than two discs can be utilized where desirable.

As seen in FIG. 7, the standing trees 124 of a woody growth to be harvested lie in the path of the tree feller 110 moving along its axis of movement 122, and the angled, directional tree felling bar 116 will contact each tree stem 126 to put it under tension to tend to cause it to fall forwardly and to the right as seen in FIG. 7. Substantially simultaneously, the blade 114 will sever that stem at its tree stem butt 128, leaving a tree stump 130 which does not protrude above the ground but is flush with the surface of the ground. As the tree feller moves forward, the felled tree lying on the ground will tend to resist movement longitudinally of the stem and will either be forced out longitudinally against such resistance by the blade as it moves forward, or will slide off of the blade, thus moving clear of the tree feller blade and bulldozer. As the tree feller progresses, each of the tree stem butts will, in turn, encounter the alignment discs of the rotary rake and the stem and the other parts of the tree will be moved outwardly of the rake and generally into parallel alignment with respect to the longitudinal axis of movement 122 of the bulldozer 112 of the tree feller 110.

The apparatus and method of the present invention will be particularly useful in northern areas of the country where the woody growth to be harvested freezes in the wintertime. This makes it possible to utilize the tree feller 110 to cleanly shear and slice the frozen tree from its frozen roots at ground level when the sap is not flowing. In the winter or springtime or later, the trees and other woody growth can be harvested by the tree harvester 10 moving generally in the direction of movement of the tree feller as indicated by the arrow 120, with the tree harvester moving to position the longitudinal main frame axis 13 in generally parallel relationship to the previous longitudinal axis of movement 122 of the tree feller 110.

When necessary or desirable, the felled trees can be left in place to air dry and can be harvested later when the ratio of moisture to dry wood fibers is within acceptable limits.

In climates, under time constraints, or under any other circumstances where severing of the tree stems from their stumps and roots at ground level while frozen is not possible or desirable, satisfactory preparation of the felled trees for harvesting by the tree harvester 10 can be accomplished by the use of chain saws or by tree fellers which hold a tree upright, shear it off at ground level, transport the severed tree to a desirable location and then deposit it on the ground to have the alignment needed to be handled effectively by the tree harvester.

As an aid to the processing of trees which lie in the path of the tree harvester with the tree stem butt lying outside of the outermost reach of the alignment discs, a knuckle boom loader grapple 21 can be provided, and can be controlled from within the operator's cab to lift the tree stem generally into alignment with chipper inlet port 47.

Although the present invention has been described with reference to preferred embodiments, workers skilled in the art will recognize that changes may be made in form and detail without departing from the spirit and scope of the invention.

What is claimed is:

1. An tree harvester for harvesting felled trees including:
    (a) a wheel mounted, longitudinally extending, main frame;
    (b) a prime mover associated with the main frame and operable to move the main frame along its longitudinal axis in a forward direction;
    (c) a felled tree processor supported on the main frame and having a forwardly facing infeed port for receiving trees to be processed and having an discharge port for discharging processed trees;
    (d) tree stem infeed means mounted with respect to the main frame in position to lift stems of felled trees as the main frame moves forward and to carry said stems into the felled tree processor infeed port; and
    (e) funneling means extending forwardly of the main frame operable to move trees to be harvested into longitudinal alignment with the tree stem infeed means and the infeed port as the main frame moves in its forward direction.

2. The tree harvester of claim 1 wherein:
    (f) the funneling means includes:
        (1) a pair of alignment disc support arms mounted with respect to the main frame, one on each side of the tree processor infeed port, said arms extending forwardly from the processor and diverging outwardly from each other,
        (2) at least two upright partially overlapping, ground-contacting, felled tree alignment discs rotatably mounted with respect to each of the disc support arms to be in facing relation to the discs on the other arm, a rearward portion of each forward disc being positioned in overlapping relation to a forward portion of its adjacent rearward disc and on a side of the rearward disc toward the longitudinal axis of movement of the main frame, and
        (3) means to cause the discs to rotate in a direction to move their upper portions in a forward direction when said main frame moves in a forward direction thus to cause stems of felled trees being harvested to tend to move toward the longitudinal axis of movement of the main frame as said felled trees are contacted by the discs; and
    (g) the discs and support arms being so positioned that the stems of the trees being harvested are directed to the tree stem infeed means in longitudinal alignment with the tree processor infeed port and into the processor infeed port.

3. The tree harvester of claim 2 wherein:
    (h) the disc support arms are supported by ground engaging means rotatably mounted with respect to forward portions of the disc support arms and operative to assist in maintaining the support arms in position to tend to achieve and maintain an operative penetration of the discs into the ground during forward movement of the harvester.

4. The tree harvester of claim 3 wherein:
    (i) the ground engaging means rotatably mounted with respect to the disc support arms takes the form of a pair of wheels, each rotatably mounted to a forward portion of one of the support arms.

5. The harvester of claim 3 wherein:
    (i) the ground engaging means rotatably mounted with respect to the disc support arms takes the form of a cylindrical flange extending integrally outwardly from and in concentric relationship with respect to the forwardmost tree alignment disc on each support arm from a side of that disc opposite the side facing the longitudinal main frame axis; and (j) each cylindrical flange being concentric with the axis of rotation of said disc and being spaced inwardly from the outer periphery of the disc by a radial dimension equal to the radius of the disc less the desired amount of penetration of the disc into the ground during tree harvesting operations.

6. The tree harvester of claim 2 wherein:

(h) each of the alignment disc support arms is pivotally mounted with respect to the main frame on a substantially horizontal axis; and (i) means is provided to assist in maintaining the support arms in position to tend to achieve and maintain an operative penetration of the discs into the ground during forward movement of the harvester.

7. The tree harvester of claim 6 wherein:

(j) the means to assist in maintaining the disc support arms takes the form of a pair of wheels, each rotatably mounted to a forward portion of one of the support arms.

8. The tree harvester of claim 6 wherein:

(j) the means to assist maintaining the disc support arms takes the form of a cylindrical flange extending integrally outwardly from and in concentric relationship with respect to the forwardmost tree alignment disc on each support arm from a side of that disc opposite the side facing the longitudinal main frame axis; and (k) each cylindrical flange is concentric with the axis of rotation of its disc and is spaced inwardly from the outer periphery of the disc by a radial dimension equal to the radius of the disc less the desired amount of penetration of the disc into the ground during tree harvesting operations.

9. The tree harvester of claim 6 wherein:

(j) the means to assist maintaining the disc support arms takes the form of a motor means mounted between the main frame and each of the disc support arms and operative to exert controlled downward pressure on each of the support arms.

10. The tree harvester of claim 9 wherein:

(k) said motor means is also operative selectively to lift the disc support arms to bring the discs into clearing relation to the ground to facilitate transport and maneuvering of the harvester when not performing its harvesting function.

11. A tree harvester for harvesting felled trees including:

(a) a wheel mounted, longitudinally extending, main frame;

(b) a prime mover associated with the main frame and operable to move the main frame along its longitudinal axis in a forward direction;

(c) a tree chipper supported on the main frame and having a forwardly facing infeed port for receiving trees to be reduced to chips and having an discharge port for discharging such chips;

(d) a chipper infeed cylinder rotatably mounted with respect to the main frame on a generally horizontal axis in position to lift stems of felled trees as the main frame moves forward and to carry them into the chipper infeed port;

(e) means to rotate said cylinder in direction to carry trees into the chipper;

(f) a pair of alignment disc support arms mounted with respect to the main frame, one on each side of the chipper infeed port, said arms extending generally horizontally and forwardly from the chipper and diverging outwardly from each other;

(g) at least two upright partially overlapping, ground contacting, felled tree alignment discs rotatably mounted with respect to each of the disc support arms to be in facing relation to the discs on the other arm, a rearward portion of each forward disc being positioned in overlapping relation to a forward portion of its adjacent rearward disc and on a side of the rearward disc toward the longitudinal axis of movement of the main frame;

(h) means to cause the discs to rotate in direction to move their upper portions in a forward direction when said main frame moves in a forward direction to cause stems of felled trees being harvested to tend to move toward the longitudinal axis of movement of the main frame as the felled trees are contacted by the discs; and (i) the discs and support arms being so positioned that the stems of the trees being harvested are directed to the chipper infeed cylinder in longitudinal alignment with the chipper infeed port and into said chipper infeed port.

12. The tree harvester of claim 11 wherein:

(j) the disc support arms are supported by ground engaging wheels operative to assist in maintaining the support arms in a generally horizontal plane.

13. The tree harvester of claim 11 wherein:

(j) the means to cause the discs to rotate includes a plurality of ground engaging teeth extending outwardly around the entire periphery of the discs.

14. The tree harvester of claim 11 wherein:

(j) the means to cause the discs to rotate includes power driven motor means operably effective on the discs at the point of their rotational mounting with respect to the disc support arms.

15. The tree harvester of claim 14 wherein:

(k) the power driven motor means includes alignment disc shafts integral with the discs and rotatably mounted with respected to the disc support arms, and hydraulic motors mounted with respect to the disc support arms in rotational driving relationship with respect to said disc shafts.

16. The tree harvester of claim 12 wherein:

(k) each of the felled tree alignment discs is rotatably mounted with respect to its alignment disc support arm at a rear portion of its own independent hinged jump link, each such hinged jump link being pivotally mounted for movement in a vertical plane at a forward end portion thereof to one of the disc support arms in position to be nominally supported on an upper surface of said disc support arm.

17. The tree harvester of claim 16 wherein:

(l) each alignment disc support arm is pivotally mounted at a rear end thereof to a forward portion of the main frame in such a manner as to permit movement of the support arm in a vertical plane responsive to vertical movement of its disc support arm wheel running over the ground.

18. The tree harvester of claim 12 wherein:

(k) each alignment disc support arm is pivotally mounted at a rear end thereof to a forward portion of the main frame in such a manner as to permit movement of the support arm in a vertical plane responsive to vertical movement of its disc support arm wheel running over the ground.

19. A method of managing existing short rotation woody plantations in geographical areas where temperatures occur which are low enough to freeze growing wood fibers above and below ground, the method including the following steps:

(a) when wood fibers in the tree stems above ground and in root systems at least immediately below ground are frozen, sever the tree stems above ground from their root systems at ground level using a shearing or slicing action;

(b) fell the severed trees to tend to cause trees adjacent to each other to fall to have their tree stems all pointing the same way and in roughly mutual parallel relation to each other;

(c) harvest aligned adjacent felled trees by feeding their butt ends into a tree stem infeed port of a movable tree chipper as the chipper moves toward the tree stems in direction longitudinally of the aligned tree stems; and (d) permit multiple tree stems to sprout from the ground level severed root systems and to grow until they form the next short rotation existing woody plantation.

20. The method of claim 19 wherein:

(e) the felled trees are left on the ground until they have air dried to achieve a desired moisture to wood fiber ratio.

21. The method of claim 19 wherein:

(e) the felled trees are further aligned to form windrows: and (f) each windrowed tree is funneled to be in longitudinal alignment with the direction of forward movement of the chipper tree stem inlet port and its tree stem butt moved into vertical alignment with that port prior to the chipper moving into operational contact with that tree.

22. The method of harvesting trees to reduce them to chips of wood fibers, including the following steps:

(a) first felling trees whenever convenient, desirable, necessary or possible and arranging the felled trees in windrows with their tree stems all pointing generally in the same direction;

(b) next as a separate step, when the felled trees are found to have a moisture to wood content within an acceptable predetermined range, feeding the butt ends of the windrowed trees into a tree stem infeed port of a movable tree chipper as the chipper moves along the windrow in direction longitudinally of the tree stems from tree stem butt toward tree tip; and (c) discharging the resulting wood chips from a chip discharge port of the chipper into a chip hopper moving with the chipper.

23. The method of claim 22 wherein:

(d) each windrowed tree is funneled to be in longitudinal alignment with the direction of the forward movement of the chipper tree stem inlet port and its free stem butt moved into vertical alignment with that port immediately prior to the chipper moving into operational contact with that tree.

* * * * *

UNITED STATES PATENT AND TRADEMARK OFFICE
CERTIFICATE OF CORRECTION

PATENT NO. : 4,784,195

DATED : November 15, 1988

INVENTOR(S) : David L. Eggen

It is certified that error appears in the above-identified patent and that said Letters Patent is hereby corrected as shown below:

Column 8, line 37, after "in", delete "a".

Column 9, line 3, delete "being" and insert --is--.

Column 10, line 40, delete "respected" and insert --respect--.

Signed and Sealed this

Twenty-fifth Day of April, 1989

Attest:

DONALD J. QUIGG

Attesting Officer

Commissioner of Patents and Trademarks